(12) United States Patent
Steinke

(10) Patent No.: US 11,035,833 B2
(45) Date of Patent: Jun. 15, 2021

(54) STACKED LAYER-TYPE MEMBER WITH INTEGRATED FUNCTIONAL COMPONENT

(71) Applicant: Agilent Technologies, Inc., Santa Clara, CA (US)

(72) Inventor: Armin Steinke, Ettlingen (DE)

(73) Assignee: Agilent Technologies, Inc., Santa Clara, CA (US)

( * ) Notice: Subject to any disclaimer, the term of this patent is extended or adjusted under 35 U.S.C. 154(b) by 429 days.

(21) Appl. No.: 15/751,738

(22) PCT Filed: Aug. 2, 2016

(86) PCT No.: PCT/IB2016/054643
§ 371 (c)(1),
(2) Date: Feb. 9, 2018

(87) PCT Pub. No.: WO2017/025857
PCT Pub. Date: Feb. 16, 2017

(65) Prior Publication Data
US 2018/0246072 A1 Aug. 30, 2018

(30) Foreign Application Priority Data

Aug. 11, 2015 (GB) .................................... 1514135

(51) Int. Cl.
*G01N 30/34* (2006.01)
*B01D 15/10* (2006.01)
(Continued)

(52) U.S. Cl.
CPC ......... *G01N 30/20* (2013.01); *F16K 99/0023* (2013.01); *F16K 99/0042* (2013.01);
(Continued)

(58) Field of Classification Search
CPC .............. G01N 35/0098; G01N 27/06; G01N 2035/00237; G01N 2035/00544;
(Continued)

(56) References Cited

U.S. PATENT DOCUMENTS 3,401,914 A * 9/1968 Shand .................... F16K 5/0673
251/172
3,680,576 A * 8/1972 Kiwak ...................... F15C 5/00
137/833
(Continued)

FOREIGN PATENT DOCUMENTS

| DE | 10314386 A1 | 10/2004 |
|---|---|---|
| WO | 9915820 A1 | 4/1999 |
| WO | 2004059474 A2 | 7/2004 |

OTHER PUBLICATIONS

GB Search Report dated Feb. 27, 2017 from GB Application No. GB1514135.1.
(Continued)

*Primary Examiner* — Brandi N Hopkins

(57) ABSTRACT

A fluidic valve for a sample separation apparatus for separating a fluid, wherein the fluidic valve comprises a stack of connected layer structures, a first conduit within the stack, a second conduit within the stack, a movable body within the stack, and an actuator configured for actuating the movable body to selectively bring the movable body into a flow enabling configuration in which flow of fluid between the first conduit and the second conduit is enabled, or into a flow disabling configuration in which flow of fluid between the first conduit and the second conduit is disabled.

12 Claims, 3 Drawing Sheets

(51) Int. Cl.
*G01N 30/20* (2006.01)
*F16K 99/00* (2006.01)
*G01N 30/60* (2006.01)
*B01L 3/00* (2006.01)

(52) U.S. Cl.
CPC .... *G01N 30/6095* (2013.01); *B01L 3/502738* (2013.01); *B01L 2400/0478* (2013.01); *B01L 2400/0616* (2013.01); *G01N 2030/204* (2013.01)

(58) Field of Classification Search
CPC ............. F16K 99/0023; F16K 99/0013; F16K 99/0059; F16K 99/0011; F16K 99/0057; F16K 2099/0076; F16K 99/0046; F16K 99/0001; F16K 2099/008; B01L 3/502738; B01L 3/5023; F15C 3/04; F15C 5/00; H01H 2029/008; Y10T 137/2191
See application file for complete search history.

(56) References Cited

U.S. PATENT DOCUMENTS

| | | | |
|---|---|---|---|
| 4,869,282 | A | 9/1989 | Sittler et al. |
| 6,739,576 | B2 | 5/2004 | O'Connor et al. |
| 6,929,239 | B1 | 8/2005 | Colin et al. |
| 8,920,645 | B2 | 12/2014 | Moran et al. |
| 10,197,189 | B2 * | 2/2019 | Pugliese ............. F16K 99/0053 |
| 2001/0054702 | A1 | 12/2001 | Williams |
| 2002/0124897 | A1 | 9/2002 | Bergh et al. |
| 2003/0116738 | A1 | 6/2003 | O'Connor et al. |
| 2005/0098749 | A1 | 5/2005 | Claydon et al. |
| 2007/0085188 | A1 | 4/2007 | Chang et al. |
| 2007/0131615 | A1 | 6/2007 | Moran et al. |
| 2008/0142479 | A1 | 6/2008 | Beerling et al. |
| 2009/0039057 | A1 | 2/2009 | Crockett et al. |
| 2010/0076628 | A1 | 3/2010 | Boorman et al. |
| 2011/0042605 | A1 | 2/2011 | Gyger et al. |
| 2011/0151272 | A1 | 6/2011 | Brennen et al. |
| 2013/0206319 | A1 | 8/2013 | Stadelbauer et al. |
| 2015/0083369 | A1 * | 3/2015 | Fryer .................... B23K 20/24 165/104.19 |

OTHER PUBLICATIONS

GB Search Report dated May 23, 2016 from GB Application No. GB1514135.1.
International Search Report and Written Opinion dated Jan. 11, 2017 from GB Application No. PCT/IB2016/054643.

* cited by examiner

STACKED LAYER-TYPE MEMBER WITH INTEGRATED FUNCTIONAL COMPONENT

RELATED APPLICATIONS

This application is the national stage under 35 U.S.C. 371 of International Application No. PCT/IB2016/054643, filed Aug. 2, 2016, titled "STACKED LAYER-TYPE MEMBER WITH INTEGRATED FUNCTIONAL COMPONENT", which claims priority to GB Application No. GB 1514135.1, filed Aug. 11, 2015, the entire contents of both of which are incorporated herein by reference.

The present invention relates to a fluidic valve, a method of manufacturing a fluidic valve, a sample separation apparatus, a planar member, and a method of manufacturing a planar member.

In liquid chromatography, a fluidic sample and an eluent (liquid mobile phase) may be pumped through conduits and a separation unit such as a column in which separation of sample components takes place. The column may comprise a material which is capable of separating different components of the fluidic sample. The separation unit may be connected to other fluidic members (like a sampler or an injector, a detector) by conduits. Before the fluidic sample is introduced into a separation path between a fluid drive unit (in particular a high pressure pump) and the separation unit, a predefined amount of fluidic sample shall be intaken from a sample source (such as a sample container) via an injection needle into a sample loop by a corresponding movement of a piston within a metering device. This usually occurs in the presence of a significantly smaller pressure than what the separation unit is run with. Thereafter, an injector valve is switched so as to introduce the intaken amount of fluidic sample from the sample loop of a metering path into the separation path between fluid drive unit and the separation unit for subsequent separation.

At various positions of a liquid chromatography device, fluidic valves are used. For instance, a mixing unit for mixing a mobile phase from various solvent compositions, the above mentioned pump and the above mentioned injector may comprise one or more fluidic valves for selectively enabling or disabling flow of fluid through one or more conduits. Hence, fluidic valves are useful in a sample separation apparatus. Although conventional fluidic valves are powerful fluidic tools, there is still room for improvement of fluidic valves in terms of compactness, robustness and dead volume. Moreover, also an improvement of compactness and robustness of other members (such as valves) with functional components (such as a movable valve body of a valve) is desirable.

DISCLOSURE

It is an object of the invention to provide a compact and robust member (in particular a valve) with functional component (in particular a movable valve body of a valve).

According to an exemplary embodiment of the present invention, a fluidic valve (in particular for a sample separation apparatus for separating a fluid, or more generally for any fluid processing device) is provided, wherein the fluidic valve comprises a stack of (in particular integrally) connected layer structures, a first conduit (in particular defining a lumen which may accommodate fluid) within the stack, a second conduit (in particular defining a lumen which may accommodate fluid) within the stack, a movable body within the stack (i.e. a body located within the stack which can move within and relative to the stack), and an actuator configured for actuating the movable body to selectively bring the movable body into a flow enabling configuration (in particular to move or allow to move the movable body to a flow enabling position) in which flow of fluid between the first conduit and the second conduit is enabled, or into a flow disabling configuration (in particular to move or allow to move the movable body to a flow disabling position differing from the flow enabling position) in which flow of fluid between the first conduit and the second conduit is disabled.

According to another exemplary embodiment of the present invention, a sample separation apparatus for separating a fluidic sample is provided, wherein the sample separation apparatus comprises a fluid drive unit configured for driving at least a part of a fluid comprising a mobile phase and the fluidic sample in the mobile phase along a separation path, a separation unit arranged within the separation path and configured for separating the fluidic sample into a plurality of fractions, and a fluidic valve having the above mentioned features configured for selectively enabling or disabling flow of at least a part of the fluid within or into the separation path.

According to another exemplary embodiment of the present invention, a method of manufacturing a fluidic valve (in particular for a sample separation apparatus for separating a fluid) is provided, wherein the method comprises forming a first conduit within a stack of layer structures, forming a second conduit within the stack, arranging a movable body within the stack, interconnecting the stack, and configuring an actuator for actuating the movable body to selectively bring the movable body into a flow enabling configuration in which flow of fluid between the first conduit and the second conduit is enabled, or into a flow disabling configuration in which flow of fluid between the first conduit and the second conduit is disabled.

According to still another exemplary embodiment of the present invention, a planar member is provided which comprises a stack of metallic (i.e. comprising or consisting of metallic material) layer structures connected to one another, in particular by diffusion bonding, and at least one nonmetallic (i.e. comprising or consisting of nonmetallic material) functional component integrated (for instance as an inlay) with (in particular within) the stack, in particular by diffusion bonding.

According to yet another exemplary embodiment of the present invention, a method of manufacturing a planar member is provided which comprises connecting a stack of metallic layer structures to one another by diffusion bonding (in particular in combination with soldering), and integrating at least one nonmetallic functional component with (in particular within) the stack, in particular by diffusion bonding.

In the context of this application, the term "fluid" may particularly denote any liquid and/or gaseous medium, optionally including also solid particles. Such a fluid may be or may comprise or may be to be mixed with fluidic sample, which is to be analyzed. Such a fluidic sample may comprise a plurality of fractions represented by molecules or particles which shall be separated, for instance small mass molecules or large mass biomolecules such as proteins. Separation of a fluidic sample into fractions may involve a certain separation criterion (such as mass, volume, chemical properties, etc.) according to which a separation can be carried out. Alternatively, the fluid may also be a mobile phase such as a solvent or a solvent composition (for instance composed of water and an inorganic solvent).

In the context of this application, the term "sample separation apparatus" may particularly denote any apparatus which is capable of separating different fractions of a fluidic sample by applying a certain separation technique. The actual separation can be carried out in a separation unit of the sample separation apparatus. The term "separation unit" may particularly denote a member of a fluidic path through which a fluidic sample is transferred and which is configured so that, upon conducting the fluidic sample through the separation unit, fractions or groups of molecules of the fluidic sample will be at least partly spatially separated according to the difference in at least one of their properties. An example for a separation unit is a liquid chromatography column which is capable of trapping or retarding and selectively releasing different fractions of the fluidic sample.

In the context of this application, the term "diffusion bonding" may particularly denote a connection technology for connecting stacked sheets or layers, in particular comprising metallic material, by a combination of the application of heat and high pressure. More specifically, diffusion bonding may be denoted as a solid-state welding technique, capable of joining similar and dissimilar materials including metals. It operates on the materials science principle of solid-state diffusion, wherein the atoms of two solid surfaces intermingle over time under elevated temperature (for instance in a range between 800° C. and 1200° C., for example 1100° C.). Diffusion bonding can be implemented by applying both high pressure and high temperature to the materials to be welded.

According to an exemplary embodiment, a highly compact flat and planar fluidic valve is provided which is highly appropriate for microfluidic high pressure applications. This can be achieved by bonding a stack of layer structures to one another and embedding a freely and controllably movable body therein, which can be conveniently and precisely controlled with low effort from an exterior of the stack by simply operating an actuator. Such a fluidic valve may be particularly advantageously manufactured by diffusion bonding of metallic layer structures.

According to another exemplary embodiment, a planar or flat and thus compact member is formed by diffusion bonding between metallic sheet material and nonmetallic material (which may be also configured as a sheet material or with a pronounced three-dimensional structure such as a ball). Surprisingly, connection of stacked metallic sheets by diffusion bonding allows to interleave or attach also one or more non-metallic structures without deterioration or damage of the manufactured planar member. Moreover, a correspondingly manufactured flat planar member shows a high robustness.

In the following, further exemplary embodiments of the fluidic valve, the sample separation apparatus, the planar member, and the methods will be explained.

In an embodiment, at least part of the layer structures is configured as a sheet, in particular a metal sheet (for instance steel or titanium). Metal sheets are very thin though robust and sufficiently bendable during manufacturing operation. Moreover, metal sheets are simply and reliably connectable by diffusion bonding.

In an embodiment, at least part of the layer structures is configured as a patterned layer having one or more recesses constituting at least part of the first conduit and the second conduit. Patterning layers, for instance by etching, punching, laser cutting, etc. is a simple and accurate way of defining fluidic conduits or channels in a layer stack. It allows to manufacture both straight and curved conduits, and even complex bifurcations and fluidic networks.

In an embodiment, the movable body is configured as a ball. By such a ball or sphere geometry, activation of the movable body by a piston-type actuator works reliably regardless of a rotation state of the movable body.

In an embodiment, the movable body is made of a ceramic material, sapphire, or ruby. Such materials are capable of withstanding high pressure values (of several hundred bar, for instance up to 1200 bar) which may occur in modern sample separation procedures (in particular in terms of high-performance liquid chromatography, HPLC) while at the same time being capable of providing a leakage free sealing with a seat in which the movable body may rest in a fluid flow disabling operation mode. Moreover, the mentioned materials are capable of withstanding the high temperature and pressure conditions during diffusion bonding of metal sheets.

In an embodiment, the movable body is configured for being forced to rest on a seat formed by at least a part of the layer structures by the actuator in the fluid disabling configuration (in particular fluid disabling position) and is configured for being released from the seat for being brought into the fluid enabling configuration (in particular for assuming the fluid enabling position) by the actuator. In order to drive the movable body into the seat, force or pressure may be applied from the actuator onto the movable body (either directly or preferably indirectly via a force transmission mechanism). In the absence of force or pressure applied from the actuator onto the movable body, the movable body is able to move out of the seat (for instance under the influence of flowing fluid which may lift the movable body out of the seat), thereby opening a fluid passage between the first conduit and the second conduit.

In an embodiment, the actuator comprises a piston configured for axially moving (for instance for reciprocating)—when driven by a drive unit (such as an electric motor) or by the muscle force of a user—so as to selectively actuate the movable body to be transferred into the fluid enabling configuration (in particular to move into the fluid enabling position) or into the fluid disabling configuration (in particular a fluid disabling position) depending on an axial position of the piston. Such a reciprocating piston, which may move upwardly or downwardly under control of a user or a drive unit (such as a processor-controlled motor) of the fluidic valve or the sample separation apparatus, may assume two different functional positions, one relating to a fluid flow enabling operation mode and the other one relating to a fluid flow disabling operation mode of the fluidic valve. It is also possible that the fluid flow between the first conduit and the second conduit is enabled only to a certain degree by allowing the movable body to move out the seat only for a limited extent, defined by a correspondingly controllable piston position.

In an embodiment, the fluidic valve comprises a force transmission structure, in particular a force distribution structure, configured for transmitting, in particular for distributing, an actuation force from the actuator to the movable body. Such a force transmission structure may act as a force-travel transformer and as a mechanical interface between the piston and the movable body.

In an embodiment, the force transmission structure is elastic, i.e. has elastic properties. Therefore, force transmitted from the piston to the movable body can be applied to the movable body in a smooth and gentle way damping force peaks, since the elastic force transmission structure also functions as a damping element due to its elastic properties.

In an embodiment, the force transmission structure comprises an elastic membrane as at least one of the layer structures. Such an elastic membrane may be a thin bendable film being deformable when applying force or pressure by the piston. Such a membrane may, on the one hand, contribute to the sealing of the fluid flow channel between the first conduit and the second conduit and may, on the other hand, operate in a smooth way on the movable body.

In an embodiment, the force transmission structure comprises an elastic pad. For example, the elastic pad may be made of elastic polyurethane material. It may serve as a damping cushion for transmitting and spatially distributing force from the piston to the membrane, and from there to the movable body. In particular, the elastic pad may be arranged between the piston and the elastic membrane.

In an embodiment, the elastic pad has a larger lateral extension (i.e. a larger extension within a plane perpendicular to a motion direction of the piston) than at least one of the actuator and the movable body. The elastic pad may therefore balance out spatial inaccuracies concerning the relative position and orientation between piston and movable body.

In an embodiment, at least one of the layer structures is configured as a spring-type layer (for instance made of spring steel or a ceramic material). Such a spring-type layer may for example generate a biasing force biasing the movable body into a valve seat. Thus, such a spring-type layer may additionally contribute to the fluid-tight sealing between movable body and seat. Depending on its configuration and arrangement, the spring-type layer may bias the fluidic valve either into a normally open state (i.e. being open as a default state, thus enabling fluid flow in the absence of a piston force) or into a normally closed state (i.e. being closed as a default state, thus disabling fluid flow in the absence of a piston force). Surprisingly, the integration of a spring-type layer into a stack of layers connected to one another by diffusion bonding does not deteriorate the spring properties.

In an embodiment, the fluidic valve is configured as a non-return valve. Such a non-return valve (which may also be denoted as check valve or one-way valve) is a valve that (in particular when opened) allows fluid (i.e. liquid or gas) to flow through it in only one direction, but not in the opposite direction.

In an embodiment, at least a part of the stack of layer structures is connected to one another by diffusion bonding. Diffusion bonding can be implemented, according to an exemplary embodiment of the invention, by applying both high pressure and high temperature to the stacked sheets to be welded. Diffusion bonding can hence be advantageously applied to weld layered stacks of thin metal foils, which may also be recessed for conduit formation or the like. Surprisingly, conduit recesses within the stack can be advantageously maintained during diffusion bonding without deterioration.

In an embodiment, the fluidic valve according to an exemplary embodiment may be implemented at or in a mixing unit for mixing a mobile phase from various solvent compositions upstream of a fluid drive unit, and/or may be implemented at or in a fluid drive unit, and/or may be implemented at or in a proportioning valve, and/or may be implemented at or in an injector for injecting the fluidic sample into a mobile phase. Of course, fluidic valves according to exemplary embodiments of the invention may also be implemented in very different technical environments.

In an embodiment, a thickness of each of the layer structures may be in a range between 20 μm and 500 μm, in particular in a range between 50 μm and 200 μm. Preferably, outer layers of the stack may have a higher thickness (for instance between 150 μm and 250 μm) than interior layers of the stack (for instance between 50 μm and 150 μm).

Embodiments of the above described fluid valve may be implemented in conventionally available HPLC systems, such as the Agilent 1200 Series Rapid Resolution LC system or the Agilent 1100 HPLC series (both provided by the applicant Agilent Technologies—see the website www.agilent.com).

One embodiment of a sample separation apparatus, in which one or more of the above described fluidic valves may be implemented, comprises a pumping apparatus as fluid drive unit or mobile phase drive having a pump piston for reciprocation in a pump working chamber to compress liquid in the pump working chamber to a high pressure at which compressibility of the liquid becomes noticeable. This pumping apparatus may be configured to know (by means of operator's input, notification from another module of the instrument or similar) or elsewise derive solvent properties, which may be used to represent or retrieve actual thermal properties of fluidic content, which is anticipated to be in a sampling apparatus.

The separation unit of the sample separation apparatus preferably comprises a chromatographic column (see for instance the webpage_en.wikipedia.org/wiki/Column_chromatography) providing the stationary phase. The column may be a glass or steel tube (for instance with a diameter from 50 μm to 5 mm and a length of 1 cm to 1 m) or a microfluidic column (as disclosed for instance in EP 1577012 or the Agilent 1200 Series HPLC-Chip/MS System provided by the applicant Agilent Technologies). The individual components are retained by the stationary phase differently and at least partly separate from each other while they are propagating at different speeds through the column with the eluent. At the end of the column they elute one at a time or at least not entirely simultaneously. During the entire chromatography process the eluent may be also collected in a series of fractions. The stationary phase or adsorbent in column chromatography usually is a solid material. The most common stationary phase for column chromatography is silica gel, surface modified silica gel, followed by alumina. Cellulose powder has often been used in the past. Also possible are ion exchange chromatography, reversed-phase chromatography (RP), affinity chromatography and expanded bed adsorption (EBA). The stationary phases are usually finely ground powders or gels and/or are microporous for an increased surface.

The mobile phase (or eluent) can be a pure solvent or a mixture of different solvents (such as water and an organic solvent such as ACN, acetonitrile). It can be chosen for instance to minimize the retention of the compounds of interest and/or the amount of mobile phase to run the chromatography. The mobile phase can also be chosen so that the different compounds or fractions of the fluidic sample can be separated effectively. The mobile phase may comprise an organic solvent like for instance methanol or acetonitrile, often diluted with water. For gradient operation water and organic solvent are delivered in separate bottles, from which the gradient pump delivers a programmed blend to the system. Other commonly used solvents may be isopropanol, tetrahydrofuran (THF), hexane, ethanol and/or any combination thereof or any combination of these with aforementioned solvents.

The fluidic sample may comprise but is not limited to any type of process liquid, natural sample like juice, body fluids like plasma or it may be the result of a reaction like from a fermentation broth.

The pressure, as generated by the fluid drive unit, in the mobile phase may range from 2-200 MPa (20 to 2000 bar), in particular 10-150 MPa (100 to 1500 bar), and more particularly 50-120 MPa (500 to 1200 bar).

The sample separation apparatus, for instance an HPLC system, may further comprise a detector for detecting separated compounds of the fluidic sample fluid, a fractionating unit for outputting separated compounds of the fluidic sample, or any combination thereof. Further details of such an HPLC system are disclosed with respect to the Agilent 1200 Series Rapid Resolution LC system or the Agilent 1100 HPLC series, both provided by the applicant Agilent Technologies, under the website www.agilent.com.

Embodiments of the invention can be partly or entirely embodied or supported by one or more suitable software programs, which can be stored on or otherwise provided by any kind of data carrier, and which might be executed in or by any suitable data processing unit. Software programs or routines can be preferably applied in or by the control unit.

In an embodiment, at least one of the at least one functional component is integrally connected with the stack of metallic layer structures, in particular by diffusion bonding. Such a functional component may be a non-metallic inlay which may be put into a recess of a metallic layer, for instance according to Damascene technology. By such an integrated connection, one or more of the metallic layer structures on the one hand and the respective functional component on the other hand are connected to one another so as to be fixed one other, in particular in an inseparable manner. Surprisingly, such an intimate connection between metallic and nonmetallic elements can be established with higher mechanical reliability and robustness by diffusion bonding. For example, a nonmetallic (for instance ceramic) valve seat layer may be connected to neighboring metallic conduit layers by diffusion bonding.

In an embodiment, at least one of the at least one functional component is movable within the stack of metallic layer structures. Additionally or alternatively to the previously described embodiment, the interconnection of the metallic layer structures together with the nonmetallic functional component(s) in between may be carried out in such a manner that the functional component remains a separate (and separately movable) body in the readily manufactured planar member regardless of the harsh conditions (such as high pressure and high temperature) which may act thereon during the manufacturing procedure. This for instance allows to manufacture a movable valve body from a non-metallic material which may freely move within a stack of metallic sheets by diffusion bonding, which surprisingly deteriorates neither the integrity of the nonmetallic functional component in an interior of the planar member nor its capability of moving during operation.

In an embodiment, the planar member is configured as a high pressure resistant planar member, in particular capable of withstanding pressure of at least up to 1000 bar. It has been found surprisingly that even a connection of metallic sheets with nonmetallic structures by diffusion bonding results in an extremely robust planar member. Thus, the manufactured planar member may be used for applications in which high exterior and/or interior pressure is exerted to the planar member or parts thereof during operation. For example, the planar member may be configured and used as a fluidic valve having the above-mentioned features, which can be made subject to high pressure values of up to 1000 bar or more for example in the field of high performance liquid chromatography.

In an embodiment, the at least one nonmetallic functional component comprises or consists of at least one of group consisting of an inorganic material, a ceramic material, a metal oxide, and a hard material (such as a hard plastic material). Examples of nonmetallic materials which are appropriate for diffusion bonding are zirconium oxide, aluminum oxide, sapphire, ruby. In particular, a ceramic may be an inorganic, nonmetallic solid comprising metal, nonmetal or metalloid atoms primarily held in ionic and covalent bonds. The crystallinity of ceramic materials ranges from highly oriented to semi-crystalline, and often completely amorphous.

In an embodiment, the at least one nonmetallic functional component comprises at least one of the group consisting of a seat of a fluidic valve, a movable body of a fluidic valve, and a spring element. However, many other applications are possible.

In an embodiment, the described planar member may be configured as a fluidic valve having the above described features. In particular, the stack of metallic layer structures of the planar member may correspond to the stack of connected layer structures (optionally including the conduits) of the fluidic valve, and the at least one nonmetallic functional component of the planar member may correspond to the movable body and/or a valve seat of the fluidic valve.

BRIEF DESCRIPTION OF DRAWINGS

Other objects and many of the attendant advantages of embodiments of the present invention will be readily appreciated and become better understood by reference to the following more detailed description of embodiments in connection with the accompanying drawings. Features that are substantially or functionally equal or similar will be referred to by the same reference signs.

Figure 1:
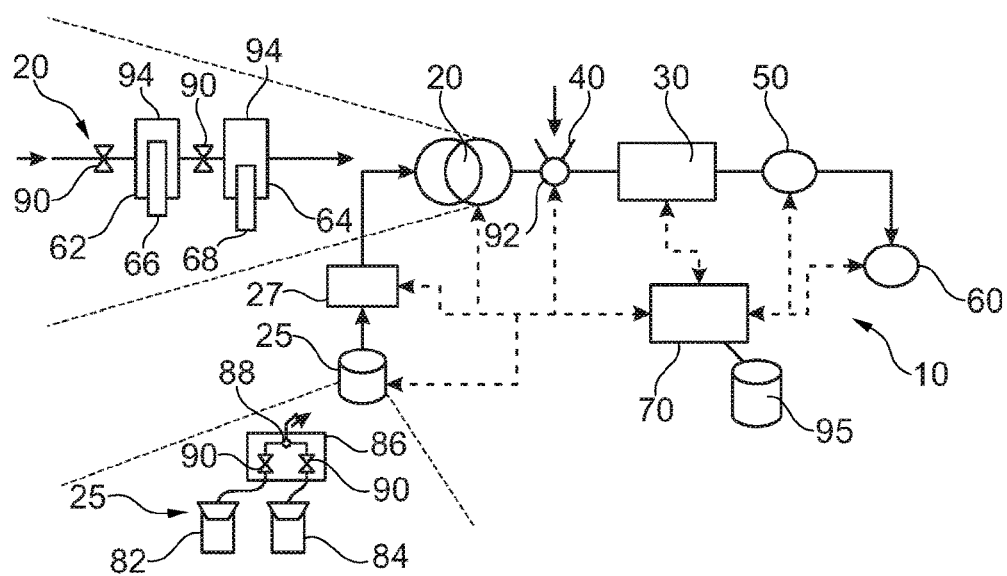
FIG. 1 illustrates a sample separation apparatus according to an exemplary embodiment of the invention.

The illustration in the drawing is schematic.

Before describing the figures in further detail, some basic considerations of the present invention will be summarized based on which exemplary embodiments have been developed.

According to an exemplary embodiment of the invention, a high pressure valve is provided which can be manufactured in diffusion bonded sheet-metal technology. According to this technology, microfluidic planar structures can be interconnected by diffusion welding to thereby obtain a high pressure robust planar microfluidic valve. In such an embodiment, it is also possible to bond ceramic components (and/or components from other nonmetallic materials) with other structures in a high pressure resistant manner. In particular, sapphire balls or spheres can be mounted in a movable way within a planar layer structure prior to a diffusion welding procedure, which can be carried out subsequently to obtain a bonding without damage or deterioration. This allows to manufacture a non-return valve in a planar layer structure architecture.

In the event of high pressure load, high forces may be exerted to membrane type outer layers of planar structures. Under certain circumstances, it may be possible that such kind of membranes cannot withstand such forces without deterioration or damage. However, when mechanically supporting such membranes from an exterior position with a hydraulic counterforce, the forces acting onto the membrane from an exterior position and from an interior position, may at least partially compensate each other. In an embodiment, such a counterpart can be generated by a cushion type elastic member (for instance from polyurethane). An external piston may be implemented as actuator for the valve and may exert a force onto the elastic member which can be translated or conveyed into an interior of the stacked layer or laminate type valve, to act on the membrane. By an appropriate dimensioning, this architecture allows to obtain a force-distance transducer reducing the required actuation force for the valve.

In an embodiment, it is also possible to combine a force-opened valve with a pin (for instance made of sapphire) arranged in an inlet channel region of the valve, which pin may be actuable via a membrane system from an exterior position of the valve.

Advantageously, a spring type element may be arranged within the planar structure so as to equip the valve with a certain degree of elasticity. Such a spring element may be made of a metal alloy (keeping its spring properties even after a bonding procedure) or from an elastic ceramic foil.

Referring now in greater detail to the drawings, FIG. 1 depicts a general schematic of a sample separation apparatus 10 configured as a liquid chromatography system. A high pressure pump as a fluid drive unit 20 receives a mobile phase from a solvent supply 25, typically via a degasser 27, which degases the solvent and thus reduces the amount of dissolved gases in the mobile phase. The fluid drive unit 20 drives the mobile phase through a separation unit 30 (such as a chromatographic column) comprising a stationary phase. A sampling unit or sample injector 40 can be provided between the mobile phase drive or fluid drive unit 20 and the separation unit 30 in order to subject or add (often referred to as sample introduction) a fluidic sample into the mobile phase. A fluidic valve (or a combination of valves) denoted as injector valve 92 is switchable between different switching positions (or combinations of positions), one of which relating to an intake of fluidic sample within the sample injector 40 at a low pressure, while another switching position relates to an introduction of previously intaken fluidic sample into a main path or separation path between fluid drive unit 20 and separation unit 30 for separation of the fluidic sample under high pressure provided by the fluid drive unit 20. The stationary phase of the separation unit 30 is configured for separating compounds of the sample liquid. A detector 50 is provided for detecting separated compounds or fractions of the fluidic sample. A fractionating unit 60 can be provided for collecting separated compounds of fluidic sample individually.

While the mobile phase can be comprised of one solvent only, it may also be mixed from plural solvents, as indicated schematically in a detail of the solvent supply 25 shown in FIG. 1. Two different solvents (such as water and an organic solvent) are stored in solvent containers 82, 84 and are supplied to a mixing unit 86 in which the two solvents are mixed at a mixing point 88. Two fluidic valves 90, which may selectively open or closed and may be configured according to an exemplary embodiment of the invention, may be located between the solvent containers 82, 84 and the mixing point 88.

The mixing might be a low pressure mixing and provided upstream of the fluid drive unit 20, so that the fluid drive unit 20 already receives and pumps the mixed solvents as the mobile phase. Alternatively, the fluid drive unit 20 may be comprised of plural individual pumping units, with plural of the pumping units each receiving and pumping a different solvent or mixture, so that the mixing of the mobile phase (as received by the separation unit 30) occurs at high pressure and downstream of the fluid drive unit 20 (or as part thereof). The composition (mixture) of the mobile phase may be kept constant over time, the so called isocratic mode, or varied over time, the so called gradient mode.

As can be taken from a further detail of the fluid drive unit 20 illustrated in FIG. 1, the fluid drive unit 20 may be composed of two serially arranged piston pump units 94, 96 each having a piston 66, 68 reciprocating within a respective pump housing 62, 64. Operation of the piston pump units 94, 96 may be synchronized or coordinated. A respective one of two fluidic valves 90, which may selectively open or closed and may be configured according to an exemplary embodiment of the invention, is located upstream of the piston pump unit 94 and between the piston pump unit 94 and the piston pump unit 96.

The above description shows that one or multiple fluidic valves 90 (which may be in particular On/Off valves or non-return valves) may be implemented in a fluid processing apparatus, such as the sample separation apparatus 10 operating in accordance with the principle of liquid chromatography.

A data processing unit or control device 70, which can be a PC or workstation or an instrument-embedded microprocessor, can be coupled (as indicated by the dotted arrows) to one or more of the devices in the sample separation apparatus 10 in order to receive information and/or control operation. For example, the control device 70 may control operation of the fluid drive unit 20 (for instance setting control parameters) and receive therefrom information regarding the actual working conditions (such as output pressure, flow rate, etc. at an outlet of the pump). The control device 70 may also control operation of the solvent supply 25 (for instance setting the solvent/s or solvent mixture to be supplied) and/or the degasser 27 (for instance setting control parameters such as vacuum level) and may receive therefrom information regarding the actual working conditions (such as solvent composition supplied over time, flow rate, vacuum level, etc.). The control device 70 may further control operation of the sample injector 40 (for instance controlling sample injection or synchronization sample injection with operating conditions of the fluid drive unit 20). The separation unit 30 may also be controlled by the control device 70 (for instance selecting a specific flow path or column, setting operation temperature, etc.), and send—in return—information (for instance operating conditions) to the control device 70. Accordingly, the detector 50 may be controlled by the control device 70 (for instance with respect to spectral or wavelength settings, setting time constants, start/stop data acquisition), and send information (for instance about the detected sample compounds) to the control device 70. The control device 70 may also control operation of the fractionating unit 60 (for instance in conjunction with data received from the detector 50). The injector valve 92 and the fluidic valve 90 are also controllable by the control device 70 for selectively enabling or disabling specific fluidic paths within sample separation apparatus 10.

Figure 2:
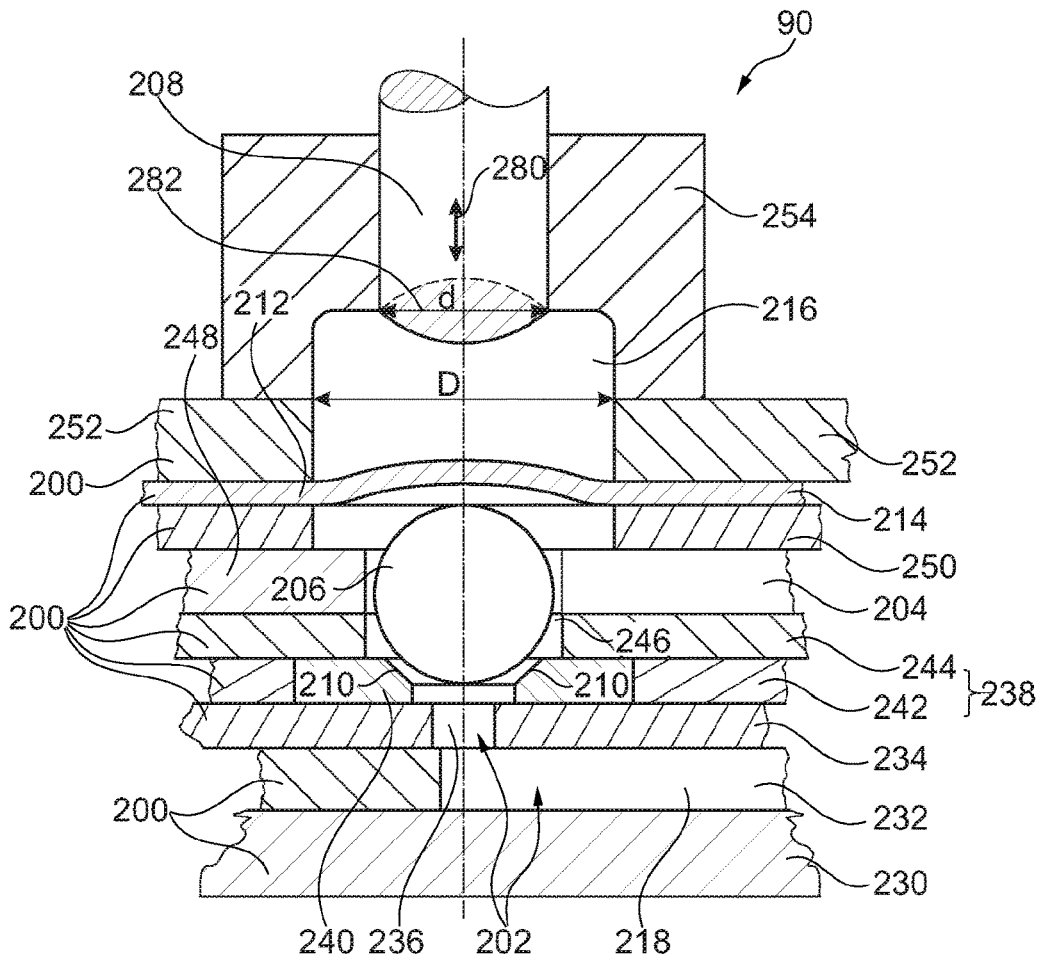
FIG. 2 shows a fluidic valve according to an exemplary embodiment.

FIG. 2 shows a fluidic valve 90 according to an exemplary embodiment of the invention which is configured as a non-return valve. The fluidic valve 90 can be implemented in the way as described above referring to FIG. 1, or at any other desired position within the sample separation apparatus 10 or in any other fluidic member or device. For instance, it may also be possible to configure the injector valve 92 from one or more fluidic valves 90 as shown in FIG. 2 or having an adapted configuration.

The fluidic valve 90 shown in FIG. 2 comprises a stack of connected layer structures 200, for instance made of steel or titanium. Each of the layer structures 200 may have, for instance, a thickness in a range between 20 μm and 500 μm. The various layer structures 200 may be bonded to one another to form a planar laminate. During manufacture of the fluidic valve 90, the stack of layer structures 200 is connected to one another by diffusion bonding so as to obtain a flat and planar high pressure robust configuration. Since the layer structures 200 are configured as sheets (some of them as metal sheets), the fluidic valve 90 is plate-shaped and hence very flat, thereby obtaining a vertically compact arrangement. As will be described below in further detail, some of the layer structures 200 are configured as patterned layers having recesses.

The fluidic valve 90 comprises a first conduit 202 (in the shown embodiment an inlet channel) configured as a recess within the stack and a second conduit 204 (in the shown embodiment an outlet channel) configured as a further recess within the stack. The function of the first conduit 202 and of the second conduit 204 can also be exchanged in each embodiment described in this application, i.e. the first conduit 202 may also function as outlet channel (i.e. may be connected to a fluidic drain), whereas the second conduit 204 may also function as inlet channel (i.e. may be connected to a fluidic source). The fluidic valve 90 may be configured or operate to function as a one-way valve, i.e. enabling only a fluid flow from the fluid inlet to the fluid outlet, or may be configured or operate to function as a two-way valve, i.e. enabling a flow from the first conduit 202 towards the second conduit 204, or from the second conduit 204 towards the first conduit 202. When the fluidic valve 90 is in an open state, fluid (in particular a liquid) is enabled to flow from the first conduit 202 into the second conduit 204. When the fluidic valve 90 is in a closed state, fluid is disabled to flow from the first conduit 202 into the second conduit 204.

For switching the fluidic valve 90 between the closed state and the open state, a movable body 206 (such as a ball or sphere, but which may alternatively be configured as a pin or any other structure, and which may be preferably made of sapphire material) is located within the stack and can be moved from an exterior of the stack by an actuator 208. The movable body 206, made of sapphire, is configured for being forced to rest on a seat 210 (which may be made of a ceramic material, preferably $ZrO_2$ or a composition of $ZrO_2$ and $Y_2O_3$) which is formed as well as part of the layer structures 200. The actuator 208 is here embodied as a movable piston and may be made from a magnetic material so as to be movable by correspondingly powering a solenoid or electromagnet (not shown). The closed position of the valve 90 can be initiated by a downward motion of the piston according to FIG. 2 so that the piston actuator 208 sealingly presses the movable body 206 into seat 210. The open position of the valve 90 can be initiated by an upward motion of the piston according to FIG. 2 so that the piston actuator 208 releases the movable body 206 and no longer presses the latter against the seat 210, thereby allowing a fluid flow.

The motion of the movable body 206 may hence be triggered or effected by a motion of the actuator 208. In the fluid disabling position, the movable body 206 sealingly sits on the seat 210 and thereby prevents flow of fluid between the first conduit 202 and the second conduit 204. However, in the absence of a vertical pressing force from the actuator 208 onto the movable body 206 against the seat 210, the movable body 206 is free to be released from the seat 210 and can therefore assume the fluid enabling position in which fluid may flow from the first conduit 202 through a central through hole in the seat 210 into the second conduit 204. To accomplish its actuation function, the actuator 208 comprises the piston which is configured for axially moving (see double arrow 280) so as to selectively actuate the movable body 206 to move into the fluid enabling position or into the fluid disabling position depending on an axial position of the piston.

More precisely, the fluidic valve 90 is configured for actuating the movable body 206 using a force transmission mechanism located between piston actuator 208 and movable body 206 to selectively move into a flow enabling position (i.e. an upper position of the actuator 208 according to FIG. 2) in which flow of fluid between the first conduit 202 and the second conduit 204 is enabled, or into a flow disabling position (i.e. a lower position of the actuator 208 according to FIG. 2) in which flow of fluid between the first conduit 202 and the second conduit 204 is disabled. In order to apply spatially distributed pressure to the movable body 206, an elastic force transmission structure 212 of the force transmission mechanism is arranged between the actuator 208 and the movable body 206 and is configured for transmitting an actuation force from the actuator 208 to the movable body 206. More specifically, the force transmission structure 212 serves as a force distribution or spreading structure distributing or spreading the force applied via a relatively small contact surface 282 of the piston actuator 208 to a larger contact surface of an elastic membrane 214 of the force transmission structure 212, wherein the membrane 214 acts directly on the movable body 206. The force transmission structure 212 thus comprises the flexible or elastic membrane 214 as one of the layer structures 200 and comprises an elastic pad 216 (for instance made of elastic polyurethane material). The elastic pad 216 is arranged between the actuator 208 and the elastic membrane 214. As can be taken from FIG. 2, the elastic pad 216 has a larger lateral extension, D, than a smaller lateral extension, d, of the actuator 208. The elastic pad 216 acts as a hydraulic medium to distribute the piston pressure homogeneously on the elastic membrane 214 and supports the elastic membrane 214. The force transmission structure 212 acts as a force-travel transformer. The bulky elastic pad 216, exerting a counterforce on the elastic membrane 214, also mechanically stabilizes the sensitive elastic membrane 214 which might otherwise get torn or break in the presence of a high pressure of for instance 1200 bar.

From bottom to top, the stacked layer laminate according to FIG. 2 comprises a bottom cover sheet 230, covered with a patterned sheet 232 in which a recess 218 forms part of the first conduit 202 and being, in turn, covered with a seal sheet 234 in which a further recess 236 is provided which forms another part of the first conduit 202 and being, in turn, covered with a spacer layer 238 (composed of a central ceramic body 240 constituting the seat 210 and a surrounding spacer annulus 242). The spacer layer 238 is covered by a patterned seal layer 244 having a central recess 246 partially for accommodating the movable body 206 and partially for forming a fluidic interface between the first conduit 202 and the second conduit 204. A further patterned sheet 248 has a recess which constitutes the second conduit 204. A patterned spacer sheet 250 is arranged on top of the further patterned sheet 248. The spacer sheet 250 is covered by the elastic membrane 214. A central portion of the elastic membrane 214 is covered by and elastically coupled to the elastic pad 216, whereas an annularly surrounding portion of the elastic membrane 214 is immovably sandwiched between the spacer sheet 250 and a top cover sheet 252. The actuator 208 configured as reciprocating piston (i.e. being capable to move upwardly or downwardly) is longitudinally guided by a guide body 254 having an accommodation recess in which the actuator 208 is accommodated. The bottom cover sheet 230 and the top cover sheet 252 are thick metal sheets functioning as a casing and mechanically stabilizing the fluidic valve 90.

It should be said that many alternatives are possible concerning the configuration of FIG. 2. For instance, it is possible to provide two membranes 214 sandwiching the movable body 206 (for instance from a top side and from a bottom side) and being actuable by two pistons (for instance from a top side and from a bottom side).

Figure 3:
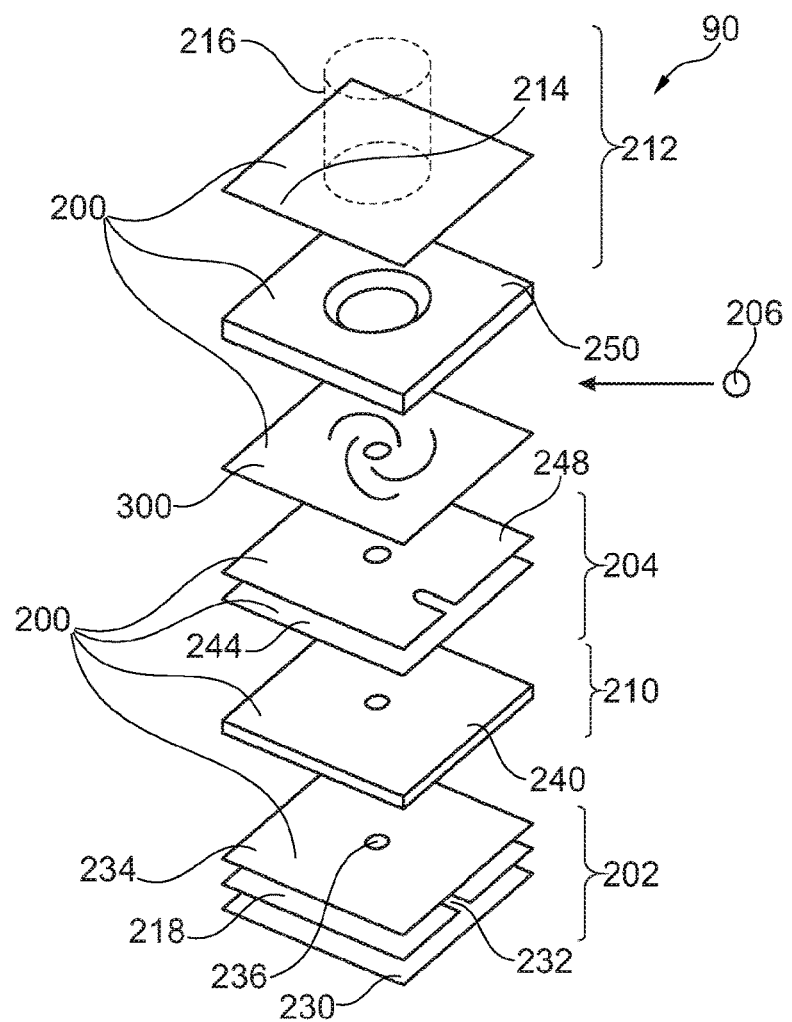
FIG. 3 shows constituents of a fluidic valve according to an exemplary embodiment.

FIG. 3 shows an explosive view of constituents of a planar fluidic valve 90 according to another exemplary embodiment of the invention.

According to the embodiment of FIG. 3, one of the layer structures 200 is configured as a spring-type layer 300 which may be made for instance of a spring-type steel or ceramic material. The movable body 206 rests on top of the spring-type layer 300 and biases the fluidic valve 90 into a normally open state. In other words, the spring force of the spring-type layer 300 keeps the movable body 206 away from the seat 210. Only when the piston actuator 208 (not shown in FIG. 3) presses the movable body 206 onto the seat 210, the fluidic valve 90 is converted into the closed state. The spring-type layer 300 hence strengthens the elastic properties of the fluidic valve 90 and contributes to a biasing of the fluidic valve 90 into the open position.

According to FIG. 3, the seat 210 is illustrated as a full layer with a central recess. However, it may be advantageous to configure the seat 210 as ceramic inlay to be inserted into a central recess of a metallic layer (see reference numeral 242 in FIG. 2) in Damascene technology and to integrally fix this structure by diffusion bonding. An advantage of such a configuration is that fitting issues and thermal stress induced by different thermal expansion properties of the ceramic material of the seat 210 on the one hand and vertically surrounding metallic material on the other hand can be suppressed.

Referring to FIG. 3, the components according to reference numerals 212 (hydroformed bellow), 250 (spacer sheet), 300 (spring-type layer, for instance made of steel) and the movable body 206 (such as a sapphire ball) can be bonded with valve manifold. Alternatively, at least a part of these components may also form a separate mounted assembly.

Figure 4:
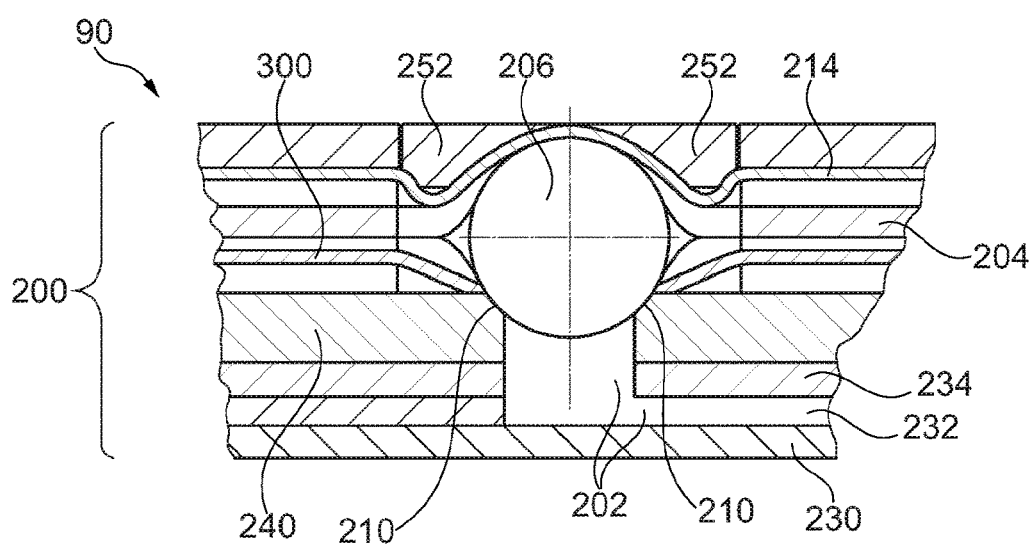
FIG. 4 shows a detailed view of a part of a fluidic valve according to an exemplary embodiment.

FIG. 4 shows a detailed view of a part of a fluidic valve 90 according to an exemplary embodiment of the invention.

In the embodiment according to FIG. 4, the metallic material of the top cover sheet 252 presses against PEEK (Polyetheretherketone) material of the flexible membrane 214. Furthermore, the ceramic body 240 is made of a combination of $ZrO_2$ and $Y_2O_3$.

Figure 5:
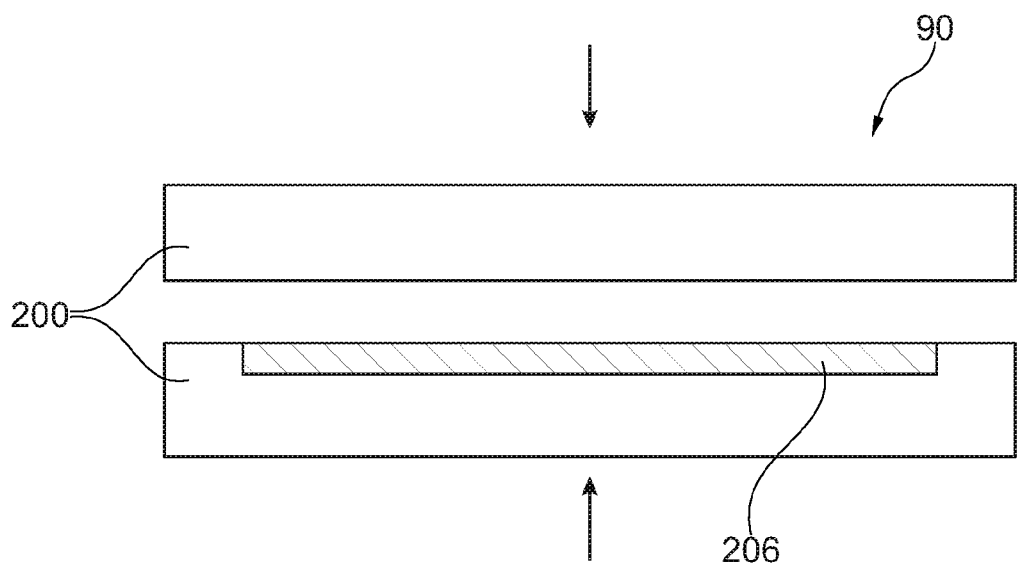
FIG. 5 and FIG. 6 show cross-sectional views of planar members according to exemplary embodiments of the invention manufactured using diffusion bonding and illustrated before a connection between various layer structures.

FIG. 5 show a cross-sectional view of a planar member, here configured as part of a fluidic valve 90, according to an exemplary embodiment of the invention manufactured using diffusion bonding. The illustration according to FIG. 5 relates to a situation before a connection between various layer structures.

The planar member comprises a stack of metallic layer structures 200, for instance made of steel or titanium, and being connected to one another by diffusion bonding. If desired, the connection strength may be further improved by connecting the metallic layer structures 200 by soldering (and additionally, if desired, by adhesive). Additionally, a nonmetallic functional component 206, which can be made of zirconium oxide, is immovably integrated within the stack. The nonmetallic functional component 206 may be configured as a valve seat. The nonmetallic functional component 206 according to FIG. 5 is integrally connected with the stack of metallic layer structures 200 by diffusion bonding. The nonmetallic functional component 206 according to FIG. 5 is embedded in one of the metallic layer structures 200 in accordance with Damascene technology. The planar member of FIG. 5 is configured as a high pressure resistant planar member 90 which is capable of withstanding pressure of at least up to 1000 bar.

Figure 6:
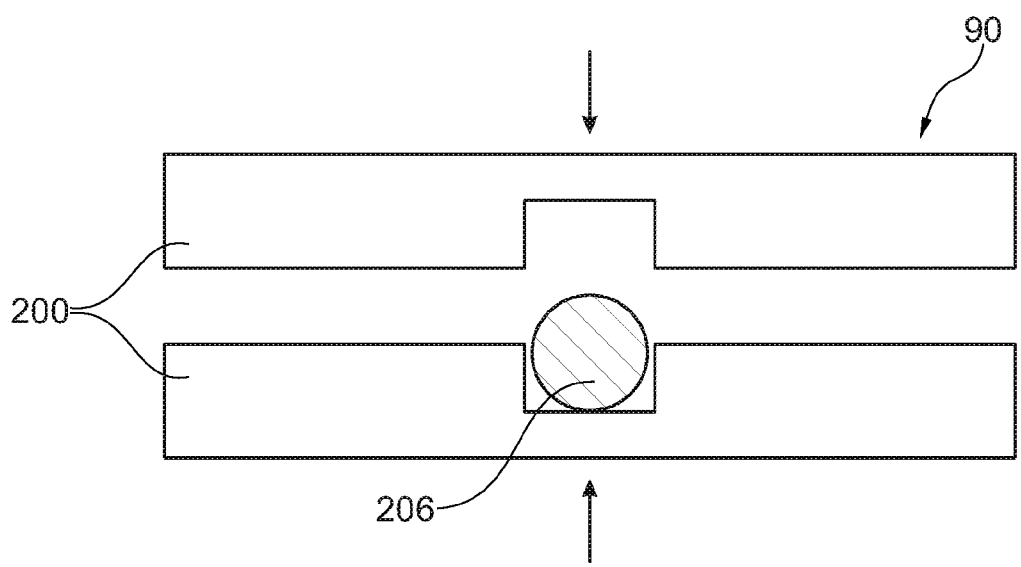

FIG. 6 show a cross-sectional view of a planar member, configured as part of a fluidic valve 90, according to another exemplary embodiment of the invention manufactured using diffusion bonding. The illustration according to FIG. 6 relates to a situation before a connection between various layer structures.

A main difference between the embodiment of FIG. 5 and the embodiment of FIG. 6 is that according to FIG. 6 the nonmetallic functional component 206 may be configured to be movable within the layer structures 200, in particular as a movable valve body. The nonmetallic functional component 206 according to FIG. 6, which can be made of sapphire or ruby, is embedded within a void within the stack of metallic layer structures 200 by diffusion bonding. The dimension of the void is larger than a dimension of the functional component 206. Correspondingly, the nonmetallic functional component 206 according to FIG. 6 is movable within the void of the stack of metallic layer structures 200 after completion of the manufacturing procedure of the planar member.

It should be noted that the term "comprising" does not exclude other elements or features and the term "a" or "an" does not exclude a plurality. Also elements described in association with different embodiments may be combined. It should also be noted that reference signs in the claims shall not be construed as limiting the scope of the claims.

The invention claimed is:

1. A fluidic valve for a sample separation apparatus for separating a fluid, the fluidic valve comprising:
   a planar member comprising a stack of layer structures and a non-metallic movable body movable within the stack, wherein the stack comprises a stack of metallic layer structures connected to one another by diffusion bonding;
   a first conduit within the stack;
   a second conduit within the stack;
   an actuator configured for actuating the movable body to selectively bring the movable body into a flow enabling configuration in which flow of fluid between the first conduit and the second conduit is enabled, or into a flow disabling configuration in which flow of fluid between the first conduit and the second conduit is disabled; and
   a force transmission structure configured for transmitting an actuation force from the actuator to the movable body, the force transmission structure comprising:
      an elastic membrane as at least one of the layer structures, the elastic membrane arranged between the actuator and the movable body; and
      an elastic pad arranged between the actuator and the elastic membrane.

2. The fluidic valve according to claim 1, wherein at least one of the layer structures is configured as a sheet.

3. The fluidic valve according to claim 1, wherein at least one of the layer structures is configured as a patterned layer comprising one or more recesses constituting at least part of at least one of the first conduit and the second conduit.

4. The fluidic valve according to claim 1, wherein the movable body is configured as a ball.

5. The fluidic valve according to claim 1, wherein the movable body comprises at least one material selected from the group consisting of an inorganic material, a ceramic, a metal oxide, sapphire, ruby, and a hard plastic material.

6. The fluidic valve according to claim 1, wherein the movable body is configured for being forced to sealingly rest on a seat, formed by at least a part of the layer structures, by the actuator in the fluid disabling configuration, and is configured for being released from the seat when brought in the fluid enabling configuration by the actuator.

7. The fluidic valve according to claim 1 wherein the elastic pad has a larger lateral extension than at least one of the actuator and the movable body.

8. The fluidic valve according to claim 1, comprising at least one of the following features:
the actuator comprises a piston configured for axially moving so as to selectively actuate the movable body to be brought into the fluid enabling configuration or into the fluid disabling configuration depending on an axial position of the piston;
wherein at least one of the layer structures is configured as a spring-type layer;
configured as a non-return valve.

9. A sample separation apparatus for separating a fluidic sample, comprising:
a fluid drive unit configured for driving at least a part of a fluid comprising a mobile phase and the fluidic sample in the mobile phase along a separation path;
a separation unit arranged within the separation path and configured for separating the fluidic sample into a plurality of fractions; and
the fluidic valve according to claim 1 configured for selectively enabling or disabling flow of at least a part of the fluid within or into the separation path.

10. The sample separation apparatus according to claim 9, comprising at least one of the following features:
the sample separation apparatus is configured as one of: a chromatography sample separation apparatus; a liquid chromatography sample separation apparatus; a gas chromatography sample separation apparatus; a supercritical fluid chromatography sample separation apparatus; an electrophoresis sample separation apparatus; and, in particular a capillary electrophoresis sample separation apparatus;
the sample separation apparatus comprises an injector for introducing the fluidic sample into the mobile phase between the fluid drive unit and the separation unit;
the sample separation apparatus comprises a detector configured to detect separated fractions of at least a portion of the fluidic sample;
the sample separation apparatus comprises a fractionating unit configured to collect separated fractions of the fluidic sample;
the sample separation apparatus comprises a degassing apparatus for degassing mobile phase;
the fluid drive unit is configured for driving the fluid along the separation path with a pressure of at least 200 bar.

11. A method of manufacturing a fluidic valve, the method comprising:
forming the planar member of claim 1 by:
forming a first conduit within the stack;
forming a second conduit within the stack;
arranging the movable body to be movable within the stack;
arranging the force transmission structure to be between the actuator and the movable body; and
interconnecting at least a part of the stack by diffusion bonding; and
configuring the actuator for actuating the movable body to selectively bring the movable body into the flow enabling configuration or into the flow disabling configuration.

12. The fluidic valve according to claim 1, wherein the metallic layer structures have a composition and thickness effective to withstand an applied pressure of at least up to 1000 bar.

* * * * *